United States Patent
Claeys et al.

(10) Patent No.: US 12,340,283 B2
(45) Date of Patent: Jun. 24, 2025

(54) EXPLORING AN UNEXPLORED DOMAIN BY PARALLEL REINFORCEMENT

(71) Applicants: IMEC VZW, Leuven (BE); UNIVERSITEIT ANTWERPEN, Antwerp (BE)

(72) Inventors: Maxim Claeys, Eeklo (BE); Miguel Camelo, Wilrijk (BE); Steven Latre, Lokeren (BE)

(73) Assignees: IMEC VZW, Leuven (BE); UNIVERSITEIT ANTWERPEN, Antwerp (BE)

( * ) Notice: Subject to any disclaimer, the term of this patent is extended or adjusted under 35 U.S.C. 154(b) by 1052 days.

(21) Appl. No.: 17/283,376

(22) PCT Filed: Oct. 11, 2019

(86) PCT No.: PCT/EP2019/077563
§ 371 (c)(1),
(2) Date: Apr. 7, 2021

(87) PCT Pub. No.: WO2020/074689
PCT Pub. Date: Apr. 16, 2020

(65) Prior Publication Data
US 2021/0383273 A1    Dec. 9, 2021

(30) Foreign Application Priority Data
Oct. 12, 2018    (EP) .................................... 18200069

(51) Int. Cl.
*G06N 20/00*    (2019.01)
*G06F 9/46*    (2006.01)
(Continued)

(52) U.S. Cl.
CPC ............... *G06N 20/00* (2019.01); *G06F 9/46* (2013.01); *G06F 16/2379* (2019.01);
(Continued)

(58) Field of Classification Search
None
See application file for complete search history.

(56) References Cited

U.S. PATENT DOCUMENTS 9,792,397 B1    10/2017 Nagaraja
11,188,821 B1*    11/2021 Kalakrishnan ......... G06N 3/063
(Continued)

OTHER PUBLICATIONS

International Search Report and Written Opinion from PCT Application No. PCT/EP2019/077563, Dec. 19, 2019.
(Continued)

*Primary Examiner* — Ryan Barrett
(74) *Attorney, Agent, or Firm* — Workman Nydegger

(57) ABSTRACT

A computer-implemented method for exploring, by a table-based parallel reinforcement learning, PRL, algorithm, an unexplored domain comprising a plurality of agents and states, the unexplored domain represented by a state-action space. The method includes the steps performed by one or more of the plurality of agents receiving an assigned partition of the state-action space represented by a table; and executing during a plurality of episodes actions for states within the partition. An action transits a state; and granting to a transited state a reward; and exchanging state-action values with other agents of the plurality of agents in the domain; and updating the table.

12 Claims, 6 Drawing Sheets

(51) Int. Cl.
    *G06F 16/23*     (2019.01)
    *G06N 3/006*     (2023.01)
    *G06N 3/098*     (2023.01)
    *G06N 5/043*     (2023.01)

(52) U.S. Cl.
    CPC ............ *G06N 3/006* (2013.01); *G06N 3/098* (2023.01); *G06N 5/043* (2013.01)

(56) References Cited

U.S. PATENT DOCUMENTS

| | | | |
|---|---|---|---|
| 2016/0223218 A1 | 8/2016 | Barrett | |
| 2018/0260498 A1* | 9/2018 | Nagaraja | G06F 30/327 |
| 2018/0260692 A1* | 9/2018 | Nagaraja | G06N 3/045 |
| 2018/0293498 A1* | 10/2018 | Campos | G06N 3/008 |
| 2018/0293517 A1* | 10/2018 | Browne | H04L 67/01 |
| 2018/0357552 A1* | 12/2018 | Campos | G06N 5/043 |
| 2020/0074241 A1* | 3/2020 | Mahmood | G06V 10/96 |
| 2020/0086863 A1* | 3/2020 | Rosman | G06V 20/58 |
| 2021/0237266 A1* | 8/2021 | Kalashnikov | B25J 9/1612 |

OTHER PUBLICATIONS

Extended European Search Report from corresponding EP Application No. 18200069.5, Mar. 18, 2019.

Wang et al., "A Proactive Decision Support Method Based on Deep Reinforcement Learning and State Partition," Knowledge-Based Systems, vol. 143, Nov. 9, 2017, pp. 248-258.

Lee et al., "Adaptive State Space Partitioning for Reinforcement Learning," Engineering Applications of Artificial Intelligence, vol. 17, No. 6, Aug. 6, 2004, pp. 577-588.

* cited by examiner

EXPLORING AN UNEXPLORED DOMAIN BY PARALLEL REINFORCEMENT

FIELD OF THE INVENTION

The present invention generally relates to exploring an unexplored domain by performing a table-based parallel reinforcement learning algorithm.

BACKGROUND OF THE INVENTION

Billions of devices are nowadays connected to the Internet of Things, IoT, whereby data related to a variety of IoT applications may be stored in the cloud. The cloud provides besides a vast volume of storage capacity, both temporal and permanent, a huge amount of processing power. The devices running IoT applications generate data through sensors and push the data in the cloud, thereby shaping a centralized infrastructure. In the cloud, the data may be processed and analysed such that endpoint IoT devices may be managed and/or instructed.

Because strict requirements are present when managing and/or instructing the devices in an appropriate manner in terms of response time and mobility, such a centralized infrastructure demands severe constraints for the communication link between the devices and the cloud, which cannot always be guaranteed by a centralized infrastructure only accessible via the Internet.

To overcome this limitation, processing power and storage capacity may also be provided at a network edge, like in, for example, edge or fog computing, or even at the IoT devices themselves like in, for example, mist computing. In doing so, a distributed infrastructure arises, whereby the IoT devices may take decisions by cooperating with other IoT devices in their vicinity.

A distributed infrastructure requires constraints which are not present or more restricted in a centralized infrastructure, such as constraints related to resources in terms of bandwidth, local processing power, local storage capacity, and/or energy autonomy.

These constraints or requirements are even enforced from the fact that IoT applications are becoming smarter and are requiring algorithms that can take decisions autonomously by interacting with their environment. To do so, IoT applications require intelligent control systems, called agents, that can solve a related optimization problem by only interacting with an a priori unknown environment. Recently, reinforcement learning, RL, algorithms are increasingly being used to meet that requirement.

Through a RL algorithm, an agent interacts with its environment to learn a policy, which tells the agent what action to take under what circumstances. The goal of the agent is to derive a learning policy that allows him to get an optimal performance in the environment. To guarantee a convergence, RL algorithms may represent the learning policy as a lookup table, however, it may take a long time to converge to an optimal policy.

To reduce the time required to learn an optimal policy, Parallel Reinforcement Learning, PRL, has been proposed for designing strategies for sharing and merging knowledge among multiple agents in the environment. In PRL algorithms, independent agents interact and learn via mutual collaboration and use a unique shared policy without coordination, thereby reducing the learning time, in terms of learning episodes, proportional of the number of agents solving the problem. To this end, the learning time is defined as the number of iterations that an agent requires to find an optimal policy.

However, the execution time, in terms of time elapsed to converge to a policy that let perform the agent optimally, is not reduced in a same rate due to communication overhead and wasted learning of using overlapping search strategies, since agents, while communicating, have, on the one hand, limited resources such as bandwidth, storage, and processing power, and on the other hand no domain knowledge. To this end, the execution time is defined as the actual clock time that an agent requires to find an optimal policy It is therefore an object of the present invention to alleviate the above drawback and to provide an improved solution for exploring an unexplored domain by a table-based PRL algorithm.

SUMMARY OF THE INVENTION

This object is achieved, in a first aspect, by a computer implemented method for exploring, by a table-based PRL algorithm, an unexplored domain comprising a plurality of agents and states, the unexplored domain represented by a state-action space, the method comprising the following steps performed by one or more of the plurality of agents:
  receiving an assigned partition of the state-action space represented by a table; and
  executing during a plurality of episodes actions for states within the partition, wherein an action transits a state; and
  granting to a transited state a reward; and
  exchanging state-action values with other agents of the plurality of agents in the domain; and
  updating the table.

The unexplored domain comprises a plurality of agents and states, wherein an agent is configured to perform the enumerated steps. The unexplored domain is represented by a state-action space, wherein a state is an environmental state, and for a state, an action can be taken or executed, which changes or transits the state to another state. In other words, the unexplored domain may be represented by a set of states and a set of actions per state.

In a first step, an agent receives an assigned partition of the unexplored domain by way of a partition of the state-action space, which is presented by a table as deployed by the table-based PRL algorithm. Differently formulated, the agent receives a table which represents the unexplored domain wherefrom a part is assigned to him, whereby the table comprises actions in columns and states in rows, or vice versa.

Secondly, during a plurality of episodes the agent executes actions for states within its partition, and thus in the environment, wherein an action transits a state, and wherein an episode is to be regarded as the transition of one state to another state. In other words, the agent executes a plurality of actions thereby successively changing states. Further, each time a state is transited to another state, a reward is granted to this transited state. The granted reward represents the quality of an action taken in a given state and is used to determine a value of the action in a given state, which is a function of a reward sequence. The determined value is then stored in the table.

Next, when the agent has executed a number of actions during a number of episodes, the state-action values are exchanged with the other agents in the unexplored domain. In other words, the agent exchanges content of its table with other agents in the unexplored domain. Hereby, the agent can update its own table through the exchange of the state-action values, or values of actions taken in a given state, with the other agents.

This way, the agent starts exploring the environment of the unexplored domain and updates its assigned partition during a given number of episodes. The updates originate from the agent itself, or the other agents that transits states which are locally stored. Simultaneously, other parts of the domain are explored by the other agents. This way, the domain may be explored in a fast and efficient manner since the other agents mutually exchange their state-action values. This way, each of the agents explores a part of the domain, while, through the exchanging of state-actions values, each of the agents becomes aware of the whole domain and explores it indirectly, since for state that are not local, the agent communicates with the other agents and updates a shared table, without being forced to transited to any state thereof. Additionally, the learning time is reduced since the agents explore the environment in parallel and each of the agents learn to explore a part of the domain, albeit being aware of the rest therefrom.

Furthermore, while the agent is exploring states that are stored within its assigned partition, there is no need to communicate with other agents, such that no energy resources are wasted on a continuous communication link. The agent thus focusses on exploring the domain and on set times, data of the partition is exchanged with other agents, thereby limiting the communication overhead.

According to an embodiment, the computer-implemented method further comprises the step of:
when an agent executes an action transiting to a state outside the assigned partition, communicating with an agent having the state within its assigned partition thereby exchanging the state-action value.

When executing an action, a priori an agent doesn't know to which other next state the action transits the previous state to. It may thus occur that the action transits to a state outside the assigned partition of the agent, but inside an assigned partition of another agent. Thus, when an agent executes an action that transits a state to another state outside the assigned partition, the agent communicates with the agent having that state within its assigned partition and exchanges the state-action value therefrom, in other words with the owner of that state. Similarly, if the agent is in a state that is not locally stored and takes an action, then it exchanges the reward with the agent that stores the transited state to update the state-action values. This way, it is avoided that different agents store the same states and thus uses overlapping search strategies, which would be a waste of resources.

Differently formulated, when an agent takes an action that transits a first state to a second state, wherein the second state is stored by a remote agent, then it may require the state-action value of this second state in order to update the first state-action value from which it transited. Further, when an agent is already in a second state belonging to a partition stored by a remote agent, and the agent takes an action within this second state, then the agent may exchange the state-action value with the remote agent such that the remote agent updates the values, or the agent may exchange a received reward with the remote agent and updates himself the state-action value, and later on exchanges the updated state-value with the remote agent.

According to an embodiment, the computer-implemented method further comprises the step of:

partitioning after a predefined number of episodes the state-action space based on the number of agents and the number of states in the domain thereby obtaining a number of partitions; and
assigning a respective partition to a respective agent.

Initially, the agents receive a respective assigned partition in a randomly or stochastic manner. The initial partitioning, thus before a first episode, is thus performed in a random manner, thereby obtaining partitions which can randomly assigned to an agent. Some agents may be assigned a bigger partition compared to other partitions, and some agents may be even assigned no partition or an empty one. Next, agents take actions thereby exploring the environment during a plurality of episodes. Then, after a predefined number of these episodes the state-action space is partitioned based on the number of agents in the domain. In other words, the domain is partitioned such that each of the agents in the domain may be assigned a partition, whereby the partitions may also be equal in size. This way, the state-action space of the domain is equally distributed between the agents thereby equally using the resources as well.

According to an embodiment, the assigning is performed when the agent is configured to store the associated table.

A difference among the agents may be present, namely agents that only are able to take actions, thereby exploring the domain and updating the state-action values of tables stored by other agents, or agents that are able or configured to store the associated table, or agents that are able to take actions and also store the associated table. The latter agents are thus assigned a partition of the domain since they are able to store the associated table thereof.

When an agent during a number of episodes visits a number of states such that it no further able to store the associated table, it may contact another agent with a request to store the associated state-action values in its place.

According to an embodiment, the respective partition comprises a state firstly transited to by the respective agent and for which no action has been taken.

In other words, an agent when executing actions may transits a state to another state for which no action has been taken yet, then this state is assigned to the agent that firstly transited thereto. This way, the agent can perform only local operations on this state, minimizing the communication overhead and increasing the probability of exploiting it the most, and continue exploring the environment, such that likewise overlapping search strategies are avoided.

According to an embodiment, the computer-implemented method further comprises the following steps performed by the one or more of the plurality of agents:
subdividing the partition into subpartitions based on the number of agents, wherein a subpartition comprises a state;
ordering the subpartitions based on a number of times a respective state is transited to in a descending order.

The subdividing may be performed when the partitioning step is likewise performed. The initial assigned partition is subdivided in several internal subpartitions, where the states will be re-ordered. Each of the subpartitions may then comprises a subset of one or more states from the initial partition. The initial partition may, for example, be subdivided into two internal subpartitions, one wherein the states were mostly visited, based on a predefined threshold, and one comprising the other states. A subdividing may also be performed based on the number of agents in the environment, for example in the number of agents plus one, wherein states which are only visited a few times are stored in a last subpartition, which may be useful to be used as a wildcard for exchanging states among agents.

Thus, differently formulated, the ordering is performed by the number of times a state is transited to, this is, the state to which the agent by executing an action is mostly transited to, is placed first in the ordered subpartitions, followed by the other states, again based on the number of times the states are transited to in a descending order. This way, the agent keeps track of the states which are visited most frequently. The subdividing into subpartitions is further based on the number of agents in the domain. The number of subpartitions may, for example, be equal to the number of agents, or to the number of agents plus one. This step may, for example, be performed during the partition step.

According to an embodiment, the number of times a respective state is transited to is normalized by the total number of transitions.

Thus, when the subpartitions are ordered based on the number of times a respective state is transited to, this number is normalized by the total number of transitions inside each partition. This way, the ordering by the different agents is performed in a standardized manner, such that a comparison may be made more clearly.

According to an embodiment, the exchanging further comprises:
exchanging the state-action values of the ordered subpartitions comprising states below a predefined threshold.

The agents exchange state-action values with each other. Besides exchanging any state-action values stored in their associated table, the agents may also exchange states with all the action values associated to it. More in particular, when states associated with rewards and actions are transited to only a few times by the agent that stores them, these associated state-action values are exchanged, while the state-action values associated to more transited and/or visited states are not exchanged. The latter states are already frequently transited to by the agent and thus exploited, while the first states, thus subpartitions comprising states below a predefined threshold, are not. These states may be highly explored and/or exploit by other agents, and therefore these agents want to store them. This way, the exchanging is performed more efficiently, since only a part needs to be exchanged, while at the same time it is ensured that the whole domain is explored. In addition, it allows agents to focus on exploiting the states it transits the most and therefore the overlapping search strategies are avoided, and the communication overhead is minimized.

According to an embodiment, the computer-implemented method further comprises the following steps performed by the one or more of the plurality of agents:
deriving a local affinity policy based on actions transiting the agent to states within its respective partition.

Thus, each agent for its assigned partition labels actions in its states therein as local if such an action transits a state to another state within the assigned partition. Next, based on these local actions, the agent derives for its partition a local affinity policy that allows agents to exploit states that are already locally stored to minimize communication overhead and, in combination with the learning policy of the agent, to explore states that are not in its partition but may be part of its optimal policy. This way, through the policy, the agent has knowledge which action to take under which circumstances considering the locality of a given state to that agent. Advantageously, the agent may derive a policy within the domain without being forced to explore the whole domain, but through the aid with other agents by exchanging information thereof in the form of rewards and actions.

According to an embodiment, the PRL algorithm is a q-learning algorithm, and the state-action space is represented by a q-table.

Thus, of the learning algorithm used by each one of the PRL agents is a q-learning algorithm, the algorithm is a parallel q-learning PQL, and the state-action space is represented by a q-table. The q-learning algorithm will be partitioning the unexplored domain by representing the unexplored domain by a q-table and assigning a part of the q-table to a respective agent. Further, the q-learning algorithm will derive a policy that is optimal by maximizing an expected value of the total reward over all successive episodes, starting from an initial state. Within the q-table, q-values are stored and exchanged with the other agents.

According to a second aspect, the invention relates to a networking device configured to perform steps of the agent according to the first aspect.

The network device may, for example, be implemented in the agent or may control the agents in the domain.

According to a third aspect, the invention relates to a controller configured to perform the partitioning and assigning according to the first aspect.

The controller thus, among other steps, partitions the unexplored domain and assigns partitions to the agents.

According to a fourth aspect, the invention relates to a system comprising the networking device according to the second aspect and the controller according to the third aspect.

According to a fifth aspect, the invention relates to a computer program comprising instructions which, when the program is executed by a computer, cause the computer to carry out the method according to the first aspect.

According to a sixth aspect, the invention relates to a computer-readable data carrier having stores thereon the computer program according to the fifth aspect.

BRIEF DESCRIPTION OF THE DRAWINGS

Some example embodiments will now be described with reference to the accompanying drawings.

DETAILED DESCRIPTION OF EMBODIMENT(S)

Figure 1:
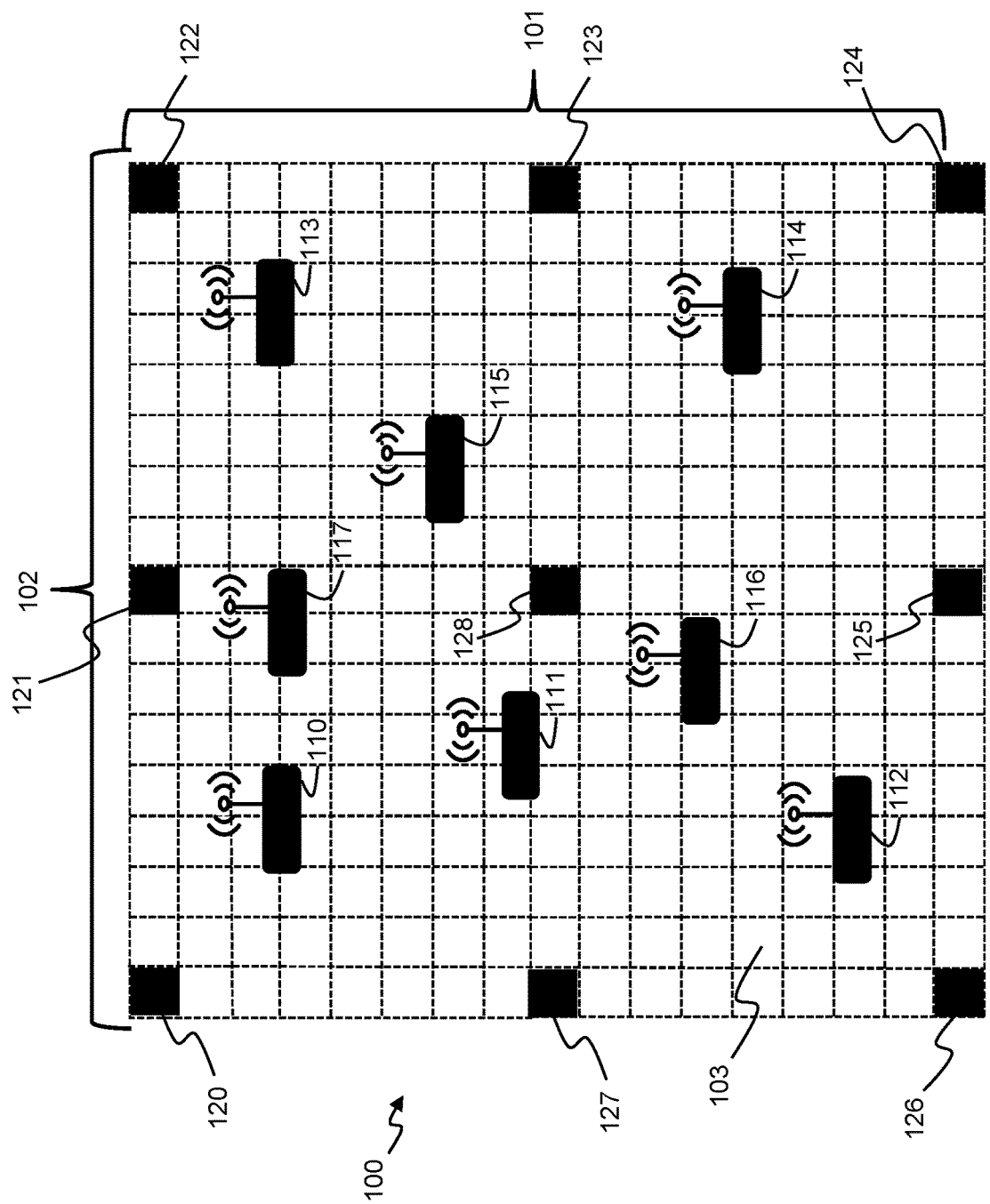
FIG. 1 illustrates an unexplored domain comprises a plurality of agent according to an embodiment of the invention.

FIG. 1 illustrates an unexplored domain comprising a plurality of agents within the domain 100, wherein the agents 110-117 are configured to perform steps to explore the unexplored domain 100 by a table-based parallel reinforcement learning (PRL) algorithm.

To illustrate the exploring of the unexplored domain 100 by such a table-based PRL algorithm, a scenario of an item-fetch use case for autonomous vehicles in a warehouse from a smart-factory internet-of-things (IoT) application is illustrated.

The following variables and parameters are introduced in the below example embodiments:
S: a set of states;
A: a set of actions;
N: a set of agents;
E: a set of episodes;
$E_{max}$: a maximum number of episodes;
S: a set of partitions;
α: learning rate;
γ: discount factor;
ε: the epsilon for an ε-greedy policy;
η: wildcard threshold;
κ: local policy affinity;
τ: local policy tolerance;
β: number of episodes before calling a partitioner;
Δ: the communication cost;
ρ: the number of remote updates;
μ: the number of iterations;
λ: the number of exchanged states;
RS: a replenishment station;
PS: a picking station.

The domain 100 represents a factory, while the agents 110-117 are autonomous vehicles, or in short robots, distributed around the factory. The task of the robots 110-117 is to transport an inventory from a replenishment station (RS) 128 to a picking station (PS) following a shortest path for reasons and efficiency, both economical and energetical. In particular, the robots or agents 110-117 need to pick orders in the PS 128 and transport the orders to one of the RSs 120-127 where they are incrementally emptied.

In the illustrative scenario of FIG. 1, there is one agent per RS 120-127, and the agents 110-117 need to learn their respective shortest path from an RS, which is a priori an unknown RS, to the location of the PS 128.

By way of this illustrative scenario, the unexplored domain 100 may be represented through a raster comprising columns 102 and rows 101. Every state in the domain 100 may then be related to a unique location, where every location is identified as a single point in a Euclidean space with two dimensions, such as state 103.

Within a state such as state 103, every agent 110-117 has eight possible actions which can be taken, namely UP, DOWN, LEFT, RIGHT and DIAGONALS. At the boundaries of the domain 100, some of the actions are excluded or ignored since they would transit the agent outside of the domain 100. If an agent arrives at a location of these boundaries, any action trying to move out of the domain 100 will result in no movement.

Figure 5:
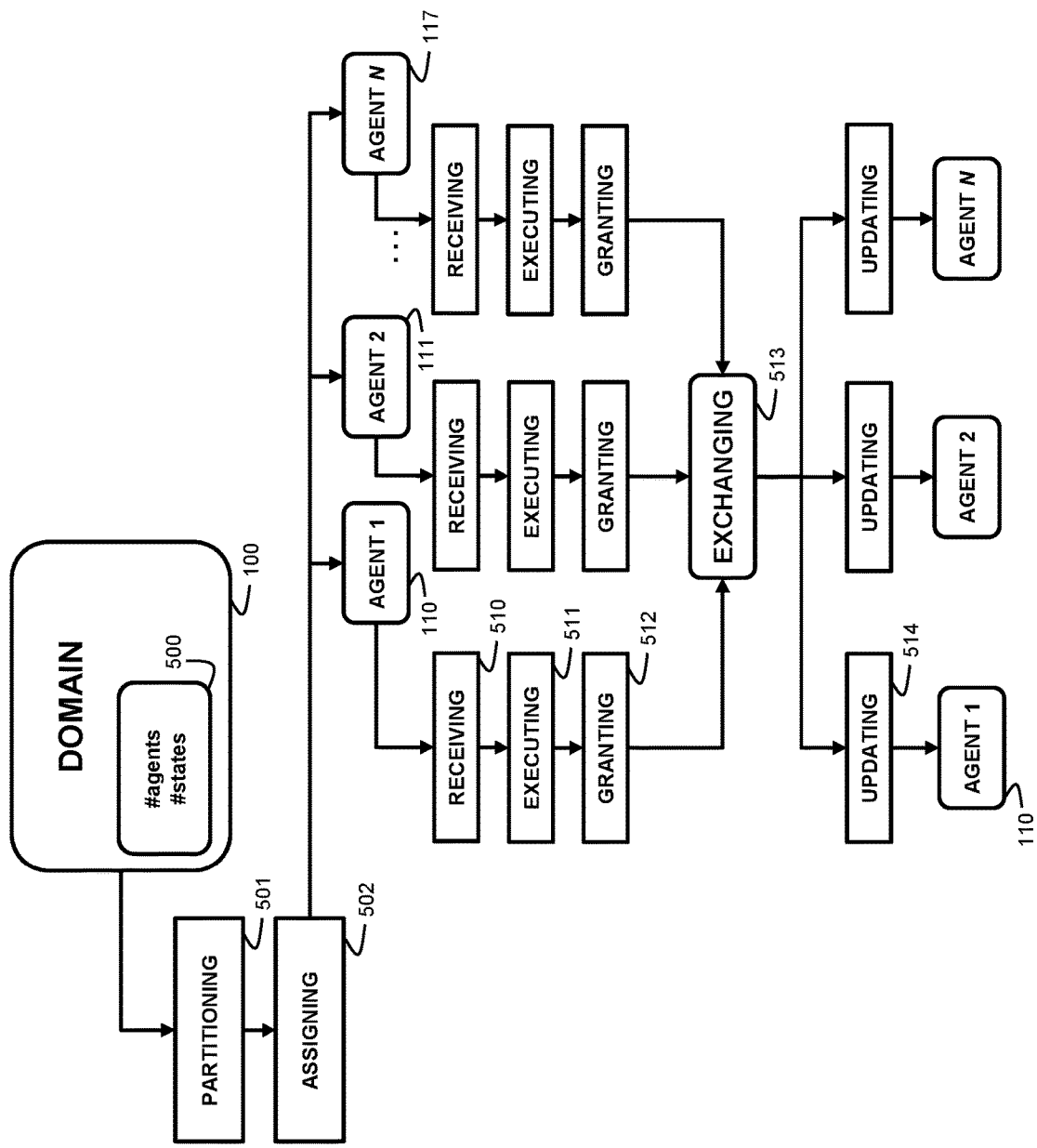
FIG. 5 illustrates steps performed to explore the unexplored domain of FIG. 1 according to an embodiment.

For each visited state, a reward of −1 is given, expected for reaching the goal state, namely the PS 128, where a reward of +100 is given. This reward configuration motivates the selection of a shortest path towards the goal state 128. To identify the shortest path for each of the agents, the domain 100 will be explored. In FIG. 5 steps performed to explore the domain 100 are illustrated. To use a PRL algorithm in this problem, the agents 110-117 must be able to be fully collaborative, update a unique and shared policy, and assume that their actions only have local effects.

The first capability implies that agents 110-117 receive a same reward after taking a same action in a same state. The second one requires that the agents 110-117 use a unique and shared policy, which is general enough to solve the problem, e.g. finding the shortest path between any initial state of the goal. The locality of the action effects can be ensured by either including a collision avoidance mechanism, in real environments, or by interacting with an isolated copy of the environment, in simulated ones. This assumption reduces the problem to a Markov Decision Process, MDP, whose action space is the joint action space of a Stochastic Game, SG.

Figure 2:
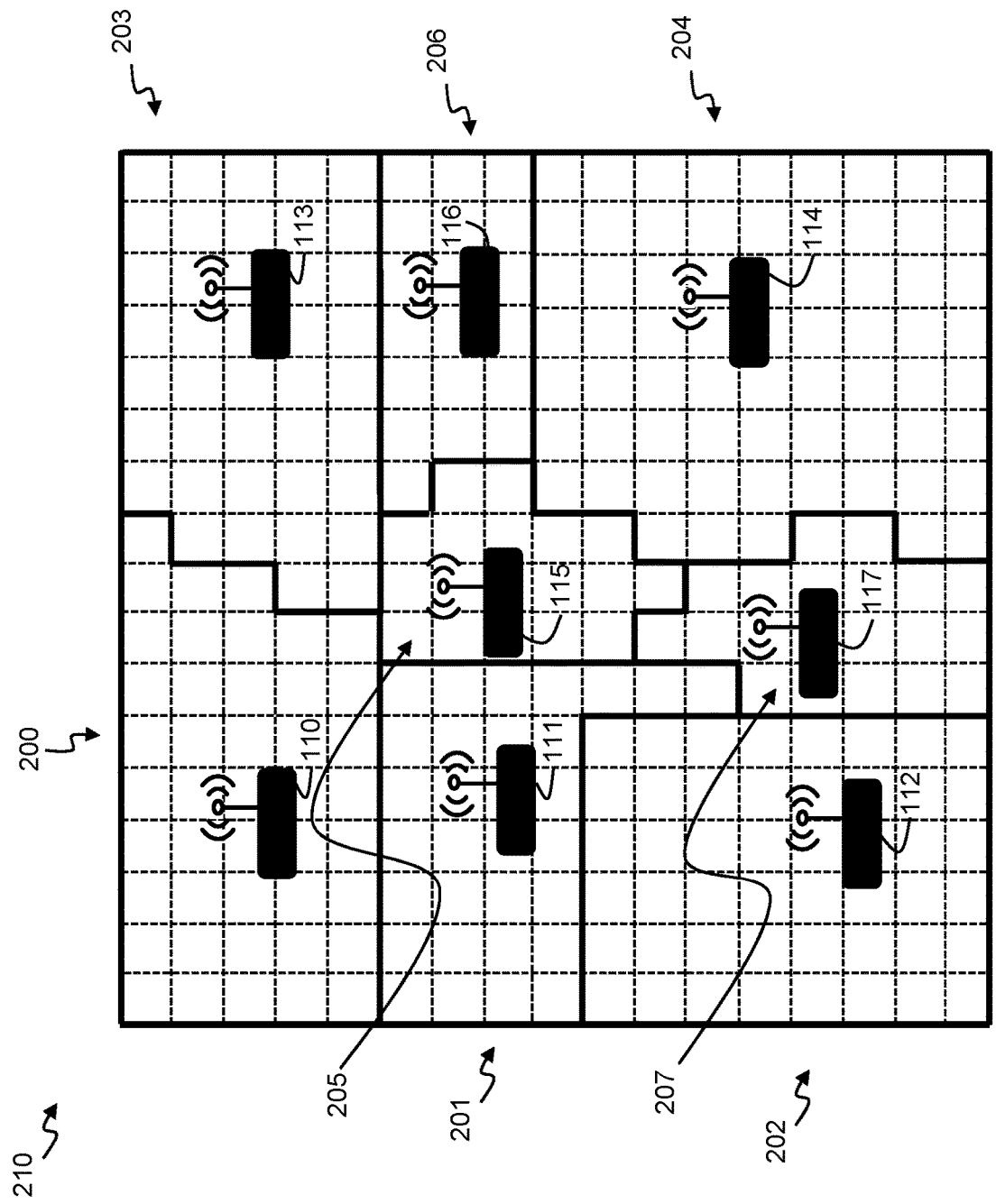
FIG. 2 illustrates a partitioning of the unexplored domain of FIG. 1 according to an embodiment.

Since the domain 100 is initially an unknown domain, the domain 100 is partitioned 501 in a random order, whereby the partitioning 501 may be based 500 on the number of agents 110-117 and the number of states in the domain 100. Next, when the domain 100 is partitioned, to the agents 110-117 a respective partition is assigned 502. In FIG. 2 such a partitioning 501 is illustrated, wherein the randomly partitioned 501 domain 210 comprises partitions 200-207 of different sizes. The different partitions are 200-207 are in a next step assigned 502 to the agents 110-117. Partition 200 is assigned to agent 110, partition 201 is assigned to agent 111, partition 203 is assigned to agent 113, partition 204 is assigned to agent 114, partition 205 is assigned to agent 115, partition 206 is assigned to agent 116, partition 207 is assigned to agent 117 and, partition 208 is assigned to agent 118.

The partitioning 501 of the domain 100, which is the state-action space, and is represented as a table, or more in particular when applying a q-learning algorithm, as a q-table, is performed dynamically. The partitioning 501 may be further illustrated by a generic PRL algorithm as listed below, illustrated by line three:

```
Require: Total states |S|, actions |A|
Require: Max number episodes E
Require: Number of episodes before calling PARTITIONER β
Require: Set of agents N with |N| = n agents
  1:   if n > 0 then
  2:     Call PARTITIONER and create the initial n partitions
  3:     Assign agents to partitions
  4:     Distributed and initialize the QT
  5:     e = 1
  6:     while e ≤ E do
  7:       Execute an episode of RL algorithm on g, ∀ g ∈ N
  8:       if reminder of e%β==0 then
  9:         Stop g, ∀ g ∈ N
 10:         Call PARTITIONER and create n partitions
 11:       end if
 12:       e = e + 1
 13:     end while
 14:     Obtain statics from g, ∀ g ∈ N
 15:   end if
 16:   return QT of size |S||A|
```

The PARTITIONER inputs are the number of states |S| in the domain 100, number of actions |A| and the number of agents 110-117. Thus, if there is an agent in the domain 100, the algorithm can be deployed.

Once the PARTITIONER has created an initial mapping of the domain 100, thus from the state-action to partitions, the partitions, for example represented by a q-table, are distributed among the agents 110-117. Next, the agents 110-117 receive 510 their respective assigned partition 200-207, and the agents 110-117 will start exploring their respective assigned partition 200-207, whereby the agents 110-117 mostly update the states in the partition that is assigned, such that a communication overhead is reduced. A PRL algorithm may further avoid communication among agents by using domain knowledge and assigning q-values following a partitioning that has optimal paths on each partition, the so-called optimal partitioning. In this case, the optimal partition will have at least one path where all the states, or most of them if the partitioning is constrained due to the state-action state structure, are in the same partition. In such a case, once the agents start following the optimal paths, no further communication, or only the minimal due to partitioning constrains, is required between the different agents.

The agents 110-117 start solving the problem in their respective assigned partition, this is executing 511 actions and granting 512 rewards, until a maximum number of episodes E is reached. While the algorithm is running, the episodes before partition parameter, or (3, defines when the agents 110-117 needs to stop executing 511 actions and granting 512 rewards and call the PARTITIONER algorithm. Alternatively, a clock time may be used to trigger the PARTITIONER instead of using the parameter (3.

Figure 3:
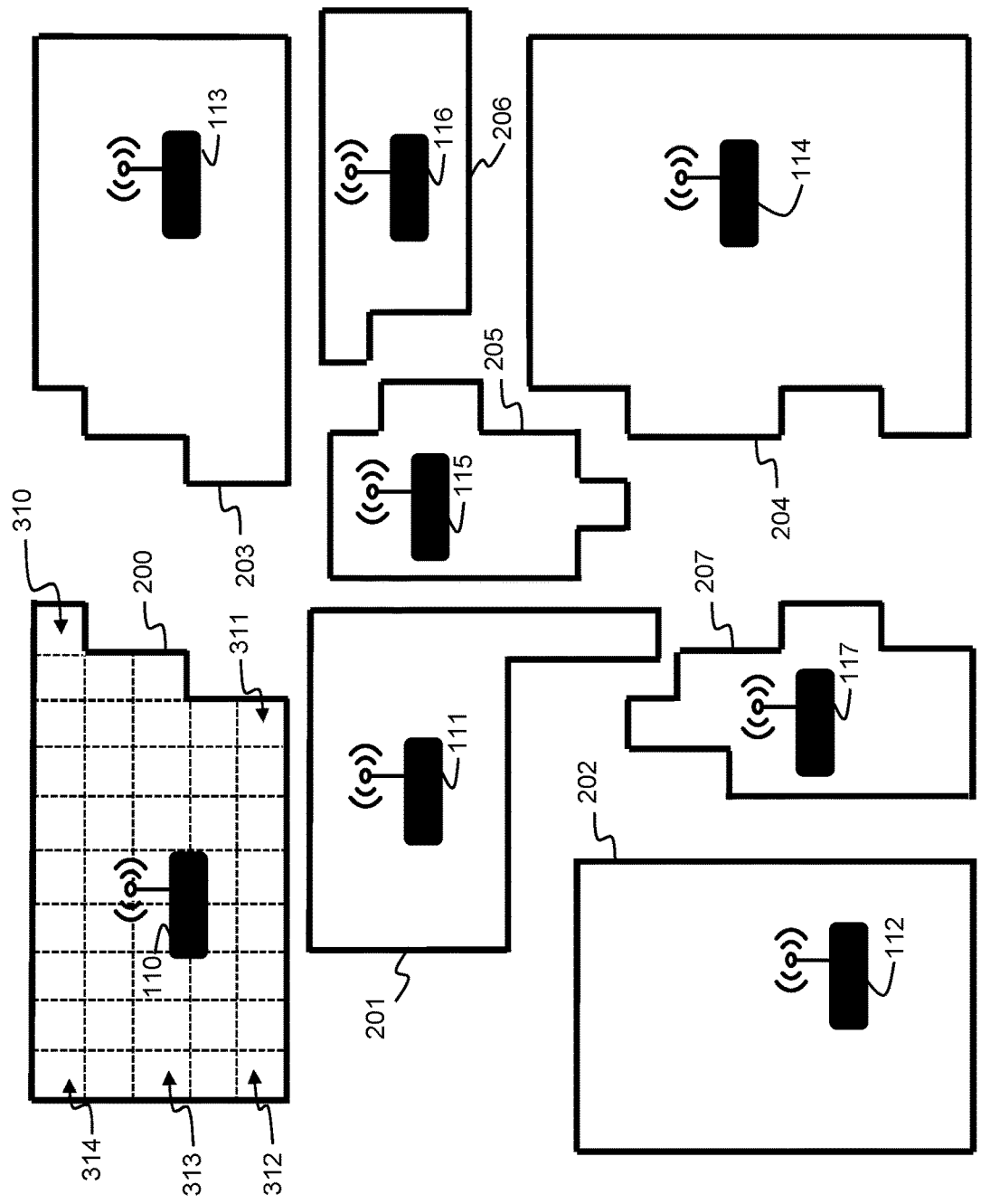
FIG. 3 illustrates a subpartition of a partition of FIG. 2 according to an embodiment.
Figure 6:
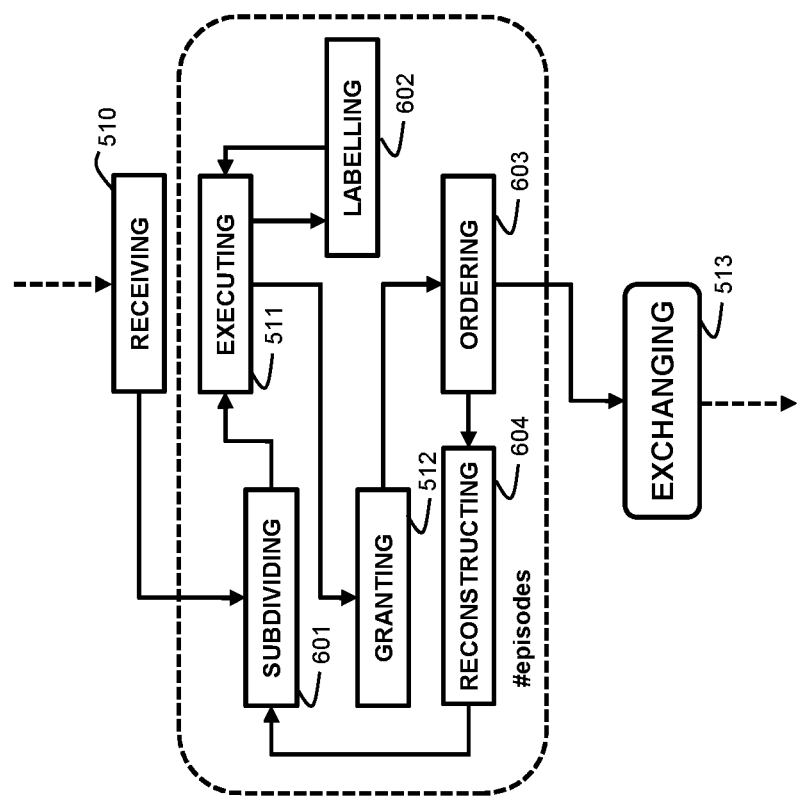
FIG. 6 illustrates steps performed for subdividing a partition and labelling a state according to an embodiment.

The PARTITIONER algorithm will now be further discusses into detail. The PARTITIONER algorithm comprises, according to an illustrative embodiment, on the one hand a local optimization procedure that splits or subdivides each partition into smaller ones, as illustrated in FIG. 3 by partition 200 comprising subpartitions 310-314 and by the steps illustrated in FIG. 6, and which is based on update statistics. On the other hand, the PARTITIONER algorithm comprises a global and distributed optimization procedure, which is based on a state-trading heuristic, that redistributes states among agents 110-117.

The local optimizer of the PARTITIONER algorithm may be further illustrated by a generic algorithm as listed below:

```
Require: Access to local partition p_l
Require: Access to local UPDATES map
Require: Threshold parameter η ∈ [0,1]
    1:    for each g_l ∈ N do
    2:        Create n + 1 internal partitions on p_l
    3:        for s ∈ S in local partition p_l do
    4:            norm_updates ← normalize total updates onstate s
    5:            if norm_updates > η then
    6:                k ← Determine id of agent that updated s the most
    7:                move s to internal partition p_{l,k}
    8:            else
    9:                move s to internal partition p_{l,k +1}
    10:           end if
    11:       end for
    12:   end for
```

Through the local optimizer, an agent subdivides 601 its assigned partition further into n+1 internal subpartitions. A data structure UPDATES(s, $g_i$) inside every state s keeps track of the number of times that state s has been updated by agent $g_i \in N$. The assignment of states of internal partitions is performed as follows as illustrated by the generic algorithm listed above: a state s∈S in the local partition $p_i \in P$ is assigned to the internal partition $p_{l,k}$ where k∈{1, n+1} and l∈{1, n}, if the agent $g_k$ has updated s the most in the previous learning period.

To avoid local optima in the global optimization step, a threshold parameter η∈{0,1} is used in the local optimizer to decide which states will be moved to the partition $p_{l,n+1}$. This parameter works as follows: before the states are assigned to the internal partitions, the total number of updates per state is normalized between zero and one. Next, all states with normalized total updates value ≤η are assigned to partition $p_{l,n+1}$. Differently formulated, $p_{l,n+1}$ comprises the states that were updated just a few times in comparison to the total number of updates performed during the previous learning period in the local partition. In the global optimization step, these states are used as a wild card in exchange with others states that an agent has updated the most remotely.

The global optimizer of the PARTITIONER algorithm may be further illustrated by a generic algorithm as listed below:

```
Require: Access to Distributed Q-Table with |S||A|values
    1:    for each pair g_l, g_k ∈ N do
    2:        for each internal partition p_{l,k} do
    3:            if |p_{l,k}| ≥ 0 then
    4:                g_l offers |p_{l,k}| states to g_k
    5:                if |p_{k,l}| ≥ 0 then
    6:                    if |p_{k,l}| ≥ |p_{l,k}| then
    7:                        g_l sends |p_{l,k}| + |p_{l,ns+1}| ≤|p_{k,l}| to g_k
    8:                    else
    9:                        g_k sends |p_{k,l}| + |p_{k,ns+1}| ≤|p_{l,k}| to g_l
    10:                   end if
    11:               end if
    12:           end if
    13:       end for
    14:   end for
```

Once the n+1 internal partitions have been created, a global trading heuristic to exchange states among partition is performed. Let $g_1$ and $g_2$ be two agents in the domain 100. If agent $g_1$ comprises states in its internal partition $p_{1,2}$, then it offers them to agent $g_2$. When the agent $g_2$ receives the offer from $g_1$, it checks how many states it comprises in its internal partition $p_{2,1}$ and exchanges 513 it with $g_1$.

When $|p_{1,2}| \leq p_{2,1}|$, agent $ag_1$ sends its states in partition $p_{1,2}$ to agent $g_2$ together with at most $z=|p_{1,2}|+|p_{2,1}|$ states from $p_{1,ns+1}$. Similarly, agent $g_2$ sends $|p_{2,1}|-z$ states from its partition $p_{2,1}$ back to $g_1$. This procedure is repeated among the agents 110-117 following a random ordering at the moment of selecting the agent to exchange states. To support stochastic environments, the map UPDATES is reset after this step. This allows faster convergence when the transition between states changes over time. Finally, after the exchanging 513 of the actions and states, the agents update 514 their respective q-table.

During a learning period, the agents 110-117 keep track of updates 514 performed by all the agents 110-117 on each local state. To explore and exploit states that are stored locally, and which may be useful states for a given agent, a local-affinity policy selects an action that previously moved the agent to another local state and whose q-value is close to the q-value of the action selected by the agent's policy. To identify if an action taken in state s moved the agent to a remote or a local state in the past, each time an action is taken, it is labelled 602 local or remote according to the location of the next state s'.

After that a local partition 200 is subdivided 601 into local subpartitions 310-314, and after grating 512 a reward, the subpartitions may be ordered 603 based on the number of times a state was visited, and further the local partition 200 is reconstructed 604.

Figure 4:
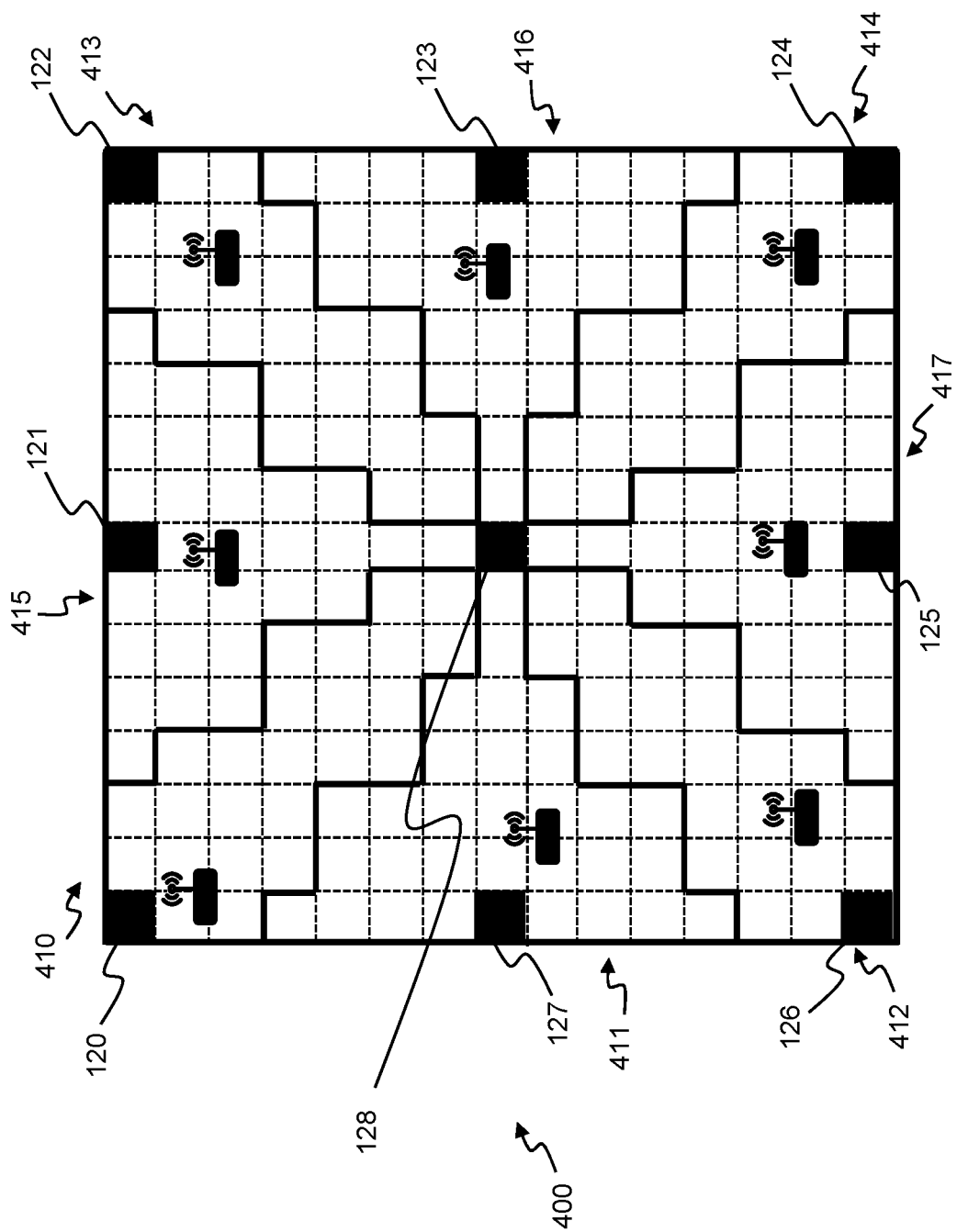
FIG. 4 illustrates the exploration of the unexplored domain of FIG. 1 according to an embodiment.

Finally, from the local actions, an agent derives a local-affinity policy which solves the problem, namely to learn their respective shortest path from a RS 120-127 to the PS 128. As a result, and as illustrated in FIG. 4, each of the agents 110-117 ends up with a respective partition 410-417 in which it optimally operates.

The local-affinity policy is executed one an agent 110-117 selects an action following its behaviour policy, for example ε-greedy. During the learning period, each agent 110-117 keeps track of the updates performed by remote agents 110-117 on its local partition. As a way of exploring states that are stored locally and may be good states for a given agent's actions, the local-affinity policy tries to select an action that in the past moved the agent to another local state and whose q-value is close to the q-value of the action selected by the agent's policy. Identifying if an action a taken in state s moved the agent to a remote/local state s' in the past is performed by, each time an action is taken, tagging it as local or remote according to the location of the next state s'.

A QL agent comprising a local-affinity policy may be illustrated by a generic algorithm as listed below:

```
Require: Access to Distributed Q-Table
Require: agent identifier l (g_l)
  1:     repeat(for each episode)
  2:     Initialize s
  3:     repeat(for each iteration)
  4:     Use behavior policy to choose a
  5:     a ← LocalAffinity(a, κ, τ)
  6:     Take action a, observe r, s'
  7:     UPDATES(s, g_l) = +1
  8:     if s' is local state then
  9:       (s, a).moveToLocal = True
 10:     else
 11:       (s, a):moveToLocal = False
 12:     s ← s'
 13:     TDerror = max_a' Q(s', a')− Q(s, a)
 14:     Q(s, a) ← Q(s, a) + α · (r + γ ·TDerror)
 15:     s ← s'
 17:     until s is goal state
 18:     until max episodes = true or convergence = true
```

Thus, given a state s, the agent selects an action a using the behaviour policy. Then, this action is evaluated by the local-affinity policy. This policy selects an alternative action a', with a probability of K∈[0, 1], which moved the agent to a local state last time it was taken, and for which the difference between Q(s, a') and Q(s, a), which is normalized in the range $|a_{max}-a_{min}|$, where $max_a Q(s', a')-Q(s, a)$ and $a_{min}=min_a Q(s, a')-Q(s, a)$, is minimal and less than a maximum tolerance τ∈[0, 1]. In other words, this policy acts as a ε-greedy policy where ε=K, which allows exploitation of local states. When no available actions move the agent to local states, then it follows the behaviour policy. Similar to the exploitation-exploration trade-off in ε-greedy policies, high values of κ may move the agent to get stuck in local states, while low values may reduce the possibility of exploring states in their local partition. The proposed policy may be illustrated by a generic pseudo-code as follows:

```
Require: action α, affinity κ and tolerance τ
  1: if random.nextDouble( ) ≥ κ then
  2: for α_2 ∈ A do
  3:   if (s, α_2).moveToLocal then
  4:     if $\frac{|Q(s, a2) - Q(s, a)|}{|Q(s, amax) - Q(s, amin)|} \leq \tau$ then
  5:       new action ← α_2
  6:     end if
  7:   end if
  8: end for
  9: end if
 10: return new action
```

The above described PARTITIONER algorithm reduces communication overhead of a conventional PRL algorithm when applied to a distributed system. This solution may be deployed for i) simulated agents deployed in the cloud/edge that are learning by interacting with an isolated simulated environment and control resource constrained robots in a physical environments; ii) physical agents interacting in a physical environment. Regarding i), off-loading the learning task from the constrained devices to cloud/edge will improve the execution time in distributed environments such as cloud/edge by minimizing the communication cost and removing the latency of taking actions and changing states in the real environment. The quality of the policy then depends on the accuracy of the environment model used by the simulated agents during training. Regarding ii), the solution reduces the energy consumption of the devices since the energy required to transmit messages over the network, e.g., in wireless devices, is minimized.

In the above described example embodiments, q-values associated with a given state are always in the same partition, i.e. the object STATE is always moved together with the q-values of their actions during partitioning. Therefore, the terms 'state' and 'q-value' are interchangeable. Alternatively, the number of visits or changes of agents may be used for specific q-values. As a result, convergence may be achieved faster at the expense of communication overhead by the increase of exchanged messages.

The above described steps according to the PARTITIONER algorithm may be implemented as an add-on or in addition to a conventional PRL algorithm. This way, a reduced execution time may be achieved in both centralised and distributed environments.

Figure 7:
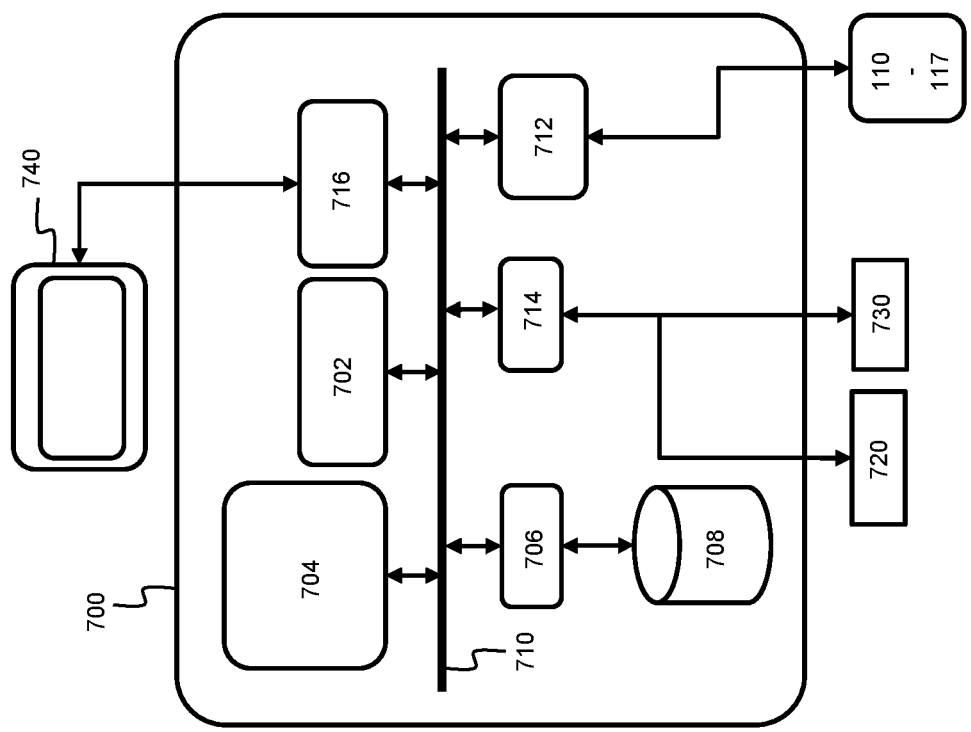
FIG. 7 illustrates a computer system that can be configured to execute one or more embodiments of the method for exploring an unexplored domain.

FIG. 7 shows a suitable computing system 700 for performing the steps according to the above embodiments. Computing system 700 may be used for exploring an unexplored domain 100. Computing system 700 may in general be formed as a suitable general-purpose computer and comprise a bus 710, a processor 702, a local memory 704, one or more optional input interfaces 714, one or more optional output interfaces 716, a communication interface 712, a storage element interface 706 and one or more storage elements 708. Bus 710 may comprise one or more conductors that permit communication among the components of the computing system 700. Processor 702 may include any type of conventional processor or microprocessor that interprets and executes programming instructions. Local memory 704 may include a random-access memory (RAM) or another type of dynamic storage device that stores information and instructions for execution by processor 702 and/or a read only memory (ROM) or another type of static storage device that stores static information and instructions for use by processor 702. Input interface 714 may comprise one or more conventional mechanisms that permit an operator to input information to the computing device 700, such as a keyboard 720, a mouse 730, a pen, voice recognition and/or biometric mechanisms, etc. Output interface 716 may comprise one or more conventional mechanisms that output information to the operator, such as a display 740, etc. Communication interface 712 may comprise any transceiver-like mechanism such as for example one or more Ethernet interfaces or wireless interfaces that enables computing system 760 to communicate with other devices and/or systems. The communication interface 712 of computing system 700 may be connected to such another computing system by means of a local area network (LAN) or a wide area network (WAN) such as for example the internet. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example SATA disk drives, and control the reading and writing of data to and/or from these storage elements 708. Although the storage elements 708 above is described as a local disk, in general any other suitable computer-readable media such as a removable magnetic disk, optical storage media such as a CD or DVD, -ROM disk, solid state drives, flash memory cards, . . . could be used. The system 700 described above can also run as a virtual machine above the physical hardware.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for exploring, by a table-based parallel reinforcement learning, PRL, algorithm, an unexplored domain comprising a plurality of agents and states, the unexplored domain represented by a state-action space, the method comprising the following steps performed by one or more of the plurality of agents:

receiving an assigned partition of the state-action space represented by a table; and executing during a plurality of episodes actions for states within the partition, wherein an action transits a state; and granting to a transited state a reward; and exchanging state-action values with other agents of the plurality of agents in the domain;

updating the table;

subdividing the partition into subpartitions based on the number of agents, wherein a subpartition comprises a subset of one or more states, by ordering the one or more states of the subpartitions based on a number of times a respective state is transited to in a descending order; and deriving a local affinity policy based on actions transiting the agent to states within its respective partition.

2. The computer-implemented method according to claim 1, further comprising the step of:

when an agent executes an action transiting to a state outside the assigned partition, communicating with an agent having the state within its assigned partition thereby exchanging the state-action value.

3. The computer-implemented method according to claim 1, further comprising the steps of:

partitioning after a predefined number of episodes the state-action space based on the number of agents and the number of states in the domain thereby obtaining a number of partitions; and assigning a respective partition to a respective agent.

4. The computer-implemented method according to claim 3, wherein the assigning is performed when the agent is configured to store the associated table.

5. The computer implemented method according to claim 3, wherein the respective partition comprises a state firstly transited to by the respective agent and for which no action has been taken.

6. The computer-implemented method according to claim 1, wherein the number of times a respective state is transited to is normalized by the total number of transitions.

7. The computer-implemented method according to claim 1, wherein the exchanging further comprises:

exchanging the state-action values of the ordered subpartitions comprising states below a predefined threshold.

8. The computer-implemented method according to claim 1, wherein the PRL algorithm is a q-learning algorithm; and
wherein the state-action space is represented by a q-table.

9. A networking device configured to perform the steps by the agent according to claim 1.

10. A controller configured to perform the partitioning and assigning according to claim 3.

11. A system comprising a networking device configured to perform the steps by the agent and a controller according to claim 3.

12. A non-transitory computer-readable data carrier having stored thereon a computer program comprising instructions which, when the program is executed by a computer, cause the computer to carry out the method according to claim 1.

* * * * *